(12) United States Patent
Godwin (10) Patent No.: US 7,523,182 B2
(45) Date of Patent: Apr. 21, 2009

(54) METHOD AND SYSTEM FOR PREDICTING THE SERVICES NEEDS OF REMOTE POINT OF SALE DEVICES

(75) Inventor: Bryan W. Godwin, Round Rock, TX (US)

(73) Assignee: Isochron, Inc., Austin, TX (US)

( * ) Notice: Subject to any disclaimer, the term of this patent is extended or adjusted under 35 U.S.C. 154(b) by 1075 days.

(21) Appl. No.: 10/304,611

(22) Filed: Nov. 26, 2002

(65) Prior Publication Data

US 2003/0101257 A1 May 29, 2003

Related U.S. Application Data

(60) Provisional application No. 60/334,016, filed on Nov. 27, 2001.

(51) Int. Cl.
G06F 17/60 (2006.01)
(52) U.S. Cl. .................. 709/223; 709/224; 702/188; 702/35; 702/185
(58) Field of Classification Search .......... 709/203, 709/223, 224; 706/21, 25, 26; 705/14, 10, 705/30, 34; 702/186
See application file for complete search history.

(56) References Cited

U.S. PATENT DOCUMENTS

| | | | |
|---|---|---|---|
| 3,784,737 A | 1/1974 | Waehner | 178/6 |
| 4,369,442 A | 1/1983 | Werth et al. | 340/825.35 |
| 4,412,292 A * | 10/1983 | Sedam et al. | 700/241 |
| 4,454,670 A | 6/1984 | Bachmann et al. | 40/584 |
| 4,553,211 A | 11/1985 | Kawasaki et al. | 364/479 |
| 4,661,862 A | 4/1987 | Thompson | 358/335 |
| 4,677,565 A | 6/1987 | Ogaki et al. | 364/479 |
| 4,766,548 A | 8/1988 | Cedrone et al. | 364/479 |
| 4,850,009 A | 7/1989 | Zook et al. | 379/96 |

(Continued)

FOREIGN PATENT DOCUMENTS

DE 41 40 450 A1 6/1993

(Continued)

OTHER PUBLICATIONS

International Preliminary Examination Report PCT/US01/31381; 4 pages, Mailed May 12, 2003.

(Continued)

Primary Examiner—Nathan J. Flynn
Assistant Examiner—Jude J Jean Gilles
(74) Attorney, Agent, or Firm—Baker Botts L.L.P.

(57) ABSTRACT

A method, system and apparatus for identifying malfunctioning remote devices, such as point of sale devices, are disclosed. In operation, a performance history for one or more remote devices is built and a normal operating day is determined from the performance history. Also extracted from this performance history are average and variance values for various aspects of satisfactory remote device performance. During remote device evaluations, the current operating performance of each remote device is compared with the normal day and the average and variance values for the respective remote device. For remote devices operating outside of the normal day, average and variances values, a likelihood estimate that the remote device is actually malfunctioning is calculated. For remote devices determined likely to be malfunctioning, an approximation of the remote device's losses are made such that the remote device with the greatest losses may be prioritized for maintenance or other purposes.

11 Claims, 3 Drawing Sheets

U.S. PATENT DOCUMENTS

| | | | |
|---|---|---|---|
| 4,926,996 A | 5/1990 | Eglise et al. | 194/212 |
| 4,954,697 A | 9/1990 | Kokubun et al. | 235/381 |
| 5,029,098 A | 7/1991 | Lavasseur | 364/479 |
| 5,077,582 A | 12/1991 | Kravette et al. | 355/206 |
| 5,090,589 A | 2/1992 | Brandes et al. | 221/2 |
| 5,091,713 A | 2/1992 | Horne et al. | 340/541 |
| 5,117,407 A | 5/1992 | Vogel | 369/30 |
| 5,184,179 A | 2/1993 | Tarr et al. | 355/206 |
| 5,207,784 A | 5/1993 | Schwartzendruber | 221/6 |
| 5,239,480 A | 8/1993 | Huegel | 364/479 |
| 5,255,819 A | 10/1993 | Peckels | 222/1 |
| 5,282,127 A | 1/1994 | Mii | 364/479 |
| 5,323,155 A | 6/1994 | Iyer et al. | 341/51 |
| 5,337,253 A | 8/1994 | Berkovsky et al. | 364/479 |
| 5,339,250 A | 8/1994 | Durbin | 364/479 |
| 5,371,348 A | 12/1994 | Kumar et al. | 235/472 |
| 5,386,360 A | 1/1995 | Wilson et al. | 364/146 |
| 5,400,246 A | 3/1995 | Wilson et al. | 364/146 |
| 5,418,945 A | 5/1995 | Carter et al. | 395/600 |
| 5,445,295 A | 8/1995 | Brown | 221/3 |
| 5,505,349 A | 4/1996 | Peckels | 222/641 |
| 5,507,411 A | 4/1996 | Peckels | 222/1 |
| 5,561,604 A | 10/1996 | Buckley et al. | 364/479.05 |
| 5,608,643 A | 3/1997 | Wichter et al. | 364/479.14 |
| 5,620,079 A | 4/1997 | Molbak | 194/217 |
| 5,649,308 A | 7/1997 | Andrews | 370/334 |
| 5,671,362 A | 9/1997 | Cowe et al. | 395/322 |
| 5,701,252 A | 12/1997 | Facchin et al. | 364/479 |
| 5,708,223 A | 1/1998 | Wyss | 73/865.9 |
| 5,769,269 A | 6/1998 | Peters | 221/7 |
| 5,787,149 A | 7/1998 | Yousefi et al. | 379/59 |
| 5,794,144 A | 8/1998 | Comer et al. | 455/426 |
| 5,805,997 A | 9/1998 | Farris | |
| 5,815,652 A | 9/1998 | Ote et al. | 395/183.07 |
| 5,818,603 A | 10/1998 | Motoyama | 358/296 |
| 5,822,216 A | 10/1998 | Satchell, Jr. et al. | 364/479.01 |
| 5,841,866 A | 11/1998 | Bruwer et al. | 380/23 |
| 5,842,597 A | 12/1998 | Kraus et al. | 221/150 R |
| 5,844,808 A | 12/1998 | Konsmo et al. | 364/479.14 |
| 5,850,187 A | 12/1998 | Carrender et al. | 340/825.54 |
| 5,860,362 A | 1/1999 | Smith | 101/494 |
| 5,862,517 A | 1/1999 | Honey et al. | |
| 5,867,688 A | 2/1999 | Simmon et al. | 395/500 |
| 5,892,758 A | 4/1999 | Argyoudis | |
| 5,898,904 A | 4/1999 | Wang | 455/31.3 |
| 5,905,442 A | 5/1999 | Mosebrook et al. | |
| 5,905,882 A | 5/1999 | Sakagami et al. | |
| 5,907,491 A | 5/1999 | Canada et al. | 364/468.15 |
| 5,909,183 A | 6/1999 | Borgstahl et al. | 340/825.22 |
| 5,915,207 A | 6/1999 | Dao et al. | 455/9 |
| 5,918,213 A | 6/1999 | Bernard et al. | 705/26 |
| 5,924,081 A | 7/1999 | Ostendorf et al. | 705/30 |
| 5,930,770 A | 7/1999 | Edgar | 705/28 |
| 5,930,771 A | 7/1999 | Stapp | 705/28 |
| 5,941,363 A | 8/1999 | Partyka et al. | 194/217 |
| 5,943,042 A | 8/1999 | Siio | 345/172 |
| 5,949,779 A | 9/1999 | Mostafa et al. | |
| 5,950,630 A | 9/1999 | Portwood et al. | 128/897 |
| 5,956,487 A | 9/1999 | Venkatraman et al. | |
| 5,957,262 A | 9/1999 | Molbak et al. | 194/200 |
| 5,959,536 A | 9/1999 | Chambers et al. | |
| 5,959,869 A | 9/1999 | Miller et al. | 364/479.1 |
| 5,979,757 A | 11/1999 | Tracy et al. | 235/383 |
| 5,982,325 A | 11/1999 | Thornton et al. | 342/357.07 |
| 5,982,652 A | 11/1999 | Simonelli et al. | 363/142 |
| 5,986,219 A | 11/1999 | Carroll et al. | 177/1 |
| 5,991,749 A | 11/1999 | Morrill, Jr. | 705/44 |
| 5,997,170 A | 12/1999 | Brodbeck | 364/479.06 |
| 6,003,070 A | 12/1999 | Frantz | |
| 6,005,850 A | 12/1999 | Moura et al. | 370/282 |
| 6,012,041 A | 1/2000 | Brewer et al. | 705/28 |
| 6,021,324 A | 2/2000 | Sizer, II et al. | |
| 6,021,437 A | 2/2000 | Chen et al. | 709/224 |
| 6,029,143 A | 2/2000 | Mosher et al. | 705/28 |
| 6,032,202 A | 2/2000 | Lea et al. | |
| 6,038,491 A | 3/2000 | McGarry et al. | 700/231 |
| 6,052,667 A | 4/2000 | Walker et al. | 705/15 |
| 6,052,750 A | 4/2000 | Lea | 710/72 |
| 6,056,194 A | 5/2000 | Kolls | 235/381 |
| 6,057,758 A | 5/2000 | Dempsey et al. | 340/539 |
| 6,061,668 A | 5/2000 | Sharrow | 705/400 |
| 6,068,305 A | 5/2000 | Myers et al. | 292/201 |
| 6,070,070 A | 5/2000 | Ladue | 455/419 |
| 6,072,521 A | 6/2000 | Harrison et al. | 348/12 |
| 6,084,528 A | 7/2000 | Beach et al. | 340/825.35 |
| 6,085,888 A | 7/2000 | Tedesco et al. | 194/217 |
| 6,119,100 A | 9/2000 | Walker et al. | 705/20 |
| 6,124,800 A | 9/2000 | Beard et al. | 340/825.35 |
| 6,131,399 A | 10/2000 | Hall | 62/127 |
| 6,161,059 A | 12/2000 | Tedesco et al. | 700/232 |
| 6,163,811 A | 12/2000 | Porter | 709/247 |
| 6,181,981 B1 | 1/2001 | Varga et al. | 700/236 |
| 6,185,545 B1 | 2/2001 | Resnick et al. | 705/40 |
| 6,199,753 B1 | 3/2001 | Tracy et al. | 235/375 |
| 6,230,150 B1 | 5/2001 | Walker et al. | 705/400 |
| 6,272,395 B1 | 8/2001 | Brodbeck | 700/236 |
| 6,289,453 B1 | 9/2001 | Walker et al. | 713/175 |
| 6,304,895 B1 | 10/2001 | Schneider et al. | 709/203 |
| 6,317,649 B1 | 11/2001 | Tedesco et al. | 700/232 |
| 6,324,520 B1 | 11/2001 | Walker et al. | 705/16 |
| 6,338,149 B1 | 1/2002 | Ciccone, Jr. et al. | 714/38 |
| 6,339,731 B1 | 1/2002 | Morris et al. | 700/236 |
| 6,341,271 B1 | 1/2002 | Salvo et al. | 705/28 |
| 6,356,794 B1 | 3/2002 | Perin, Jr. et al. | 700/78 |
| 6,385,772 B1 | 5/2002 | Courtney | 725/105 |
| 6,434,534 B1 * | 8/2002 | Walker et al. | 705/14 |
| 6,437,692 B1 | 8/2002 | Petite et al. | 340/540 |
| 6,442,532 B1 | 8/2002 | Kawan | 705/35 |
| 6,457,038 B1 | 9/2002 | Defosse | 709/200 |
| 6,462,644 B1 | 10/2002 | Howell et al. | 340/5.92 |
| 6,467,685 B1 | 10/2002 | Teicher | 235/379 |
| 6,502,131 B1 | 12/2002 | Vaid et al. | 709/224 |
| 6,505,095 B1 | 1/2003 | Kolls | 700/244 |
| 6,525,644 B1 | 2/2003 | Stillwagon | 340/5.61 |
| 6,550,672 B1 | 4/2003 | Tracy et al. | 235/383 |
| 6,553,336 B1 | 4/2003 | Johnson et al. | 702/188 |
| 6,581,986 B2 | 6/2003 | Roatis et al. | 292/199 |
| 6,584,309 B1 | 6/2003 | Whigham | 455/414 |
| 6,585,622 B1 * | 7/2003 | Shum et al. | 482/8 |
| 6,604,086 B1 | 8/2003 | Kolls | 705/14 |
| 6,604,087 B1 | 8/2003 | Kolls | 705/14 |
| 6,606,602 B1 | 8/2003 | Kolls | 705/14 |
| 6,606,605 B1 | 8/2003 | Kolls | 705/26 |
| 6,609,113 B1 | 8/2003 | O'Leary et al. | 705/39 |
| 6,615,623 B1 | 9/2003 | Ormerod | 70/224 |
| 6,646,564 B1 * | 11/2003 | Azieres et al. | 340/679 |
| 6,695,166 B2 | 2/2004 | Long | 221/14 |
| 6,704,714 B1 | 3/2004 | O'Leary et al. | 705/39 |
| 6,712,266 B2 | 3/2004 | Bartley et al. | 235/380 |
| 6,714,977 B1 | 3/2004 | Fowler et al. | 709/224 |
| 6,735,630 B1 | 5/2004 | Gelvin et al. | 709/224 |
| 6,738,811 B1 | 5/2004 | Liang | 709/224 |
| 6,748,296 B2 | 6/2004 | Banerjee et al. | 700/241 |
| 6,751,562 B1 | 6/2004 | Blackett et al. | 702/61 |
| 6,754,558 B2 | 6/2004 | Preston et al. | 700/236 |
| 6,772,048 B1 | 8/2004 | Leibu et al. | 700/241 |
| 6,826,607 B1 | 11/2004 | Gelvin et al. | 709/224 |
| 6,832,251 B1 | 12/2004 | Gelvin et al. | 709/224 |
| 6,837,436 B2 | 1/2005 | Swartz et al. | 235/472.02 |
| 6,844,813 B2 | 1/2005 | Hardman | 340/539.1 |
| 6,850,252 B1 | 2/2005 | Hoffberg | 345/716 |
| 6,859,831 B1 | 2/2005 | Gelvin et al. | 709/224 |
| 6,867,685 B1 | 3/2005 | Stillwagon | 340/5.64 |
| 6,876,988 B2 * | 4/2005 | Helsper et al. | 706/21 |

| | | | |
|---|---|---|---|
| 6,900,720 B2 | 5/2005 | Denison et al. | 340/5.9 |
| 6,925,335 B2 | 8/2005 | May et al. | 700/9 |
| 6,959,265 B1* | 10/2005 | Candela et al. | 702/186 |
| 6,973,475 B2* | 12/2005 | Kenyon et al. | 709/203 |
| 7,010,501 B1* | 3/2006 | Roslak et al. | 705/26 |
| 7,017,085 B2 | 3/2006 | Braun | 714/47 |
| 2001/0002210 A1 | 5/2001 | Petite | 379/155 |
| 2001/0042121 A1 | 11/2001 | Defosse et al. | 709/224 |
| 2001/0047410 A1 | 11/2001 | Defosse | 709/224 |
| 2001/0054083 A1 | 12/2001 | Defosse | 709/217 |
| 2002/0016829 A1 | 2/2002 | Defosse | 709/217 |
| 2002/0024420 A1 | 2/2002 | Ayala et al. | 340/5.61 |
| 2002/0032470 A1* | 3/2002 | Linberg | 607/60 |
| 2002/0082665 A1* | 6/2002 | Haller et al. | 607/60 |
| 2002/0107610 A1 | 8/2002 | Kaehler et al. | 700/232 |
| 2002/0169539 A1 | 11/2002 | Menard et al. | 701/200 |
| 2002/0194387 A1 | 12/2002 | Defosse | 709/251 |
| 2003/0003865 A1 | 1/2003 | Defosse et al. | 455/41 |
| 2003/0013482 A1 | 1/2003 | Brankovic | 455/553 |
| 2003/0097474 A1 | 5/2003 | Defosse et al. | 709/246 |
| 2003/0101257 A1 | 5/2003 | Godwin | 709/223 |
| 2003/0101262 A1 | 5/2003 | Godwin | 709/224 |
| 2003/0128101 A1 | 7/2003 | Long | 340/5.26 |
| 2003/0204391 A1 | 10/2003 | May et al. | 704/8 |
| 2004/0207509 A1 | 10/2004 | Mlynarczyk et al. | 340/5.23 |
| 2005/0161953 A1 | 7/2005 | Roatis et al. | 292/199 |
| 2005/0179544 A1 | 8/2005 | Sutton et al. | 340/543 |

FOREIGN PATENT DOCUMENTS

| | | |
|---|---|---|
| EP | 0 564 736 A1 | 10/1993 |
| EP | 0 602 787 A2 | 10/1993 |
| EP | 0 817 138 A1 | 1/1998 |
| EP | 0 999 529 | 5/2000 |
| EP | 1096408 | 5/2001 |
| FR | 2 744 545 | 2/1996 |
| FR | 2 755776 | 5/1998 |
| JP | 6296335 A2 | 10/1994 |
| JP | 9198172 A2 | 7/1997 |
| JP | 10105802 | 4/1998 |
| JP | 04253294 | 9/2002 |
| WO | WO 89/07807 | 8/1989 |
| WO | WO 95/04333 | 2/1995 |
| WO | WO 95/05609 | 2/1995 |
| WO | WO 97/09667 | 3/1997 |
| WO | WO 98/45779 | 10/1998 |
| WO | WO 99/23620 | 5/1999 |
| WO | WO 99/27465 | 6/1999 |
| WO | WO 99/36751 | 7/1999 |
| WO | WO 99/48065 | 9/1999 |
| WO | WO 00/04475 | 1/2000 |
| WO | WO 00/04476 | 1/2000 |
| WO | WO 00/31701 | 6/2000 |
| WO | 02/19281 | 3/2002 |

OTHER PUBLICATIONS

International Search Report PCT/US 03/37776, Mailed May 17, 2004.

Antronics Ltd Case Study—BT redcare Telemetry Vending Interface Unit (pp. 1-4).

Maxim/Dallas, "What is an iButton?" at internet http://www.maxim-ic.com/products/ibutton/ibuttons/, 3 pages, Dec. 29, 2005.

International Search Report for PCT/US99/05983, Mailed Aug. 13, 1999.

International Search Report PCT/US01/16749, Mailed Dec. 20, 2001.

International Search Report PCT/US01/15522, Mailed May 16, 2002.

Skywire Provides Details of Wireless 'VendView' System; Vending Times, Sep. 1994.

Skywire allows vendor tracking of pop stock and sales details; RCR, vol. 14, No. 17, Sep. 4, 1995.

Left high and dry? Sold-out machine sends for Cokes; Nashville Banner, Aug. 16, 1995.

Leitch, Carolyn, "Coke machines signal when it's time for a refill"; The Globe & Mail, Toronto, Ontario, Aug. 30, 1995.

Wireless Communications Forum; vol. III, No. 1 pp. 25-30, Apr. 1995.

Meet the Smart Coke Machine; The Sacramento Bee Business Technology; Wednesday, Aug. 30, 1995.

International Search Report PCT/US 01/31381, Mailed Nov. 7, 2002.

International Search Report PCT US 01/41640, Mailed Aug. 21, 2002.

NetBotz Internet Article, "Welcome to Netbotz" at internet <http:www.netbotz.com>, Printed May 10, 2000.

American Power Conversion Internet Article, "Lightning Advisor", at internet , <http://lightning.apcc.com>, Printed May 10, 2000.

American Products Internet Article, "Product Information", at internet, <http://www.apc.com>, Printed May 10, 2000.

Pending U.S. Appl. No. 09/853,366, entitled *Method and System for the Optimal Formatting, Reduction and Compression of DEX/UCS Data* filed May 11, 2001 by Defosse et al.

Pending U.S. Appl. No. 09/862,891, entitled *System and Apparatus for the Remote Monitoring and Control of a Computing Component*- Filed May 22, 2001 by Erin M. Defosse.

Pending U.S. Appl. No. 09/899,527, entitled *Real-Time Alert Mechanism for Monitoring and Controlling Field Assets Via Wireless and Internet Technologies* filed Jul. 5, 2001 by May et al.

Pending U.S. Appl. No. 09/923,046, entitled *System and Method for Monitoring and Control of Beverage Dispensing Equipment* filed Aug. 6, 2001 by Erin M. Defosse.

Pending U.S. Appl. No. 09/971,170, entitled *Remote Data Acquisition, Transmission and Analysis System Including Handheld Wireless Equipment* filed Oct. 4, 2001 by Defosse.

Pending U.S. Appl. No. 09/895,647, entitled *Method and System for Interfacing a Machine Controller and a Wireless Network* filed Jun. 29, 2001 by Defosse et al.

Pending U.S. Appl. No. 10/208,221, entitled *Remote Data Acquisition and Transmission System and Method* filed Jul. 30, 2002 by Erin M. Defosse.

International Preliminary Examination Report PCT/US01/31381 (3 pages), May 12, 2003.

* cited by examiner

METHOD AND SYSTEM FOR PREDICTING THE SERVICES NEEDS OF REMOTE POINT OF SALE DEVICES

CROSS REFERENCE TO RELATED APPLICATIONS

This application is related to U.S. patent application Ser. No. 09/267,254, filed Mar. 12, 1999, and entitled "Remote Data Acquisition and Transmission System and Method", now issued as U.S. Pat. No. 6,457,038.

RELATED APPLICATION

This application claims the benefit, under 35 U.S.C. § 119(e), of previously filed provisional application Method and System for Predicting the Service Needs of Remote Point of Sale Devices, Ser. No. 60/334,016, filed Nov. 27, 2001.

This application is related to copending U.S. patent application Ser. No. 10/304,603 entitled Method and System for Scheduling the Maintenance of Remotely Monitored Devices filed Nov. 26, 2002, which claims the benefit of U.S. Provisional Application Ser. No. 60/334,015 filed Nov. 27, 2001 entitled Method and System for Scheduling the Maintenance of Remotely Monitored Devices.

TECHNICAL FIELD

The present invention relates generally to distributed asset management and, more particularly, to a scheduling system for ensuring remotely monitored devices and industrial machines such as point of sale devices are maintained.

BACKGROUND OF THE INVENTION

As with most for-profit organizations, operators in the distributed device arena have long sought ways in which to increase their profits. One roadblock to maximizing profits in a distributed device environment that has persisted since its inception has been the difficulty in minimizing the downtime of malfunctioning assets. In large distributed device systems, a single operator may have assets or devices distributed about a large geographic region, each of which may be scheduled for maintenance visits days or weeks apart. In such systems, a remote device, e.g., a vending machine, remote point of sale (POS) devices, that typically turns its inventory between these regularly scheduled maintenance visits may result in significant losses to the operator should the remote device fail soon after a refill or maintenance visit.

In the past, notification of a malfunctioning remote device in a distributed asset system came from customer complaints or discovery during regularly scheduled maintenance visits. In recently developed distributed asset systems, some remote devices have been equipped with technology to generate a signal notifying an operator of the occurrence of one or more unsatisfactory operating conditions. One problem with both of the aforementioned systems is the lack of confidence in the accuracy of the respective malfunction reporting capabilities.

In a customer complaint system, it is not uncommon for the customer complaint to be resolved as a user error as opposed to a malfunctioning device upon inspection of the reportedly malfunctioning device by a technician. For example, a customer may complain of a remote device's refusal to accept paper currency as a malfunction when in fact the paper currency being used by the customer was not acceptable by the remote device. In systems where the remote devices are equipped with technology capable of generating a signal to notify an operator of a detected condition, it is not uncommon for such notifications to be erroneous both as to the condition identified and as to the actual existence of a malfunctioning at the remote device.

SUMMARY OF THE INVENTION

In accordance with teachings of the present invention, a method for determining the operational status of a remote device is provided. The method preferably includes calculating a likelihood estimator to determine whether differences between current operational characteristics or data and standard measures of satisfactory performance indicate that the remote device is operating within acceptable variances or malfunctioning.

In a further embodiment, the present invention provides a remote point of sale device having at least one application controller, a microprocessor and memory. A program of instructions is also preferably included and operable to evaluate remote POS device performance differences to determine the likelihood that the differences indicate that the remote POS device is malfunctioning. When a remote POS device is determined likely to be malfunctioning, lost sales for the likely to be malfunctioning remote POS device are preferably approximated and maintenance for the malfunctioning remote POS device is preferably scheduled according to the approximated lost sales.

In yet another embodiment, a remote device management system is provided. The remote device management system preferably includes at least one remote device and a network operations center operable to communicate with the remote device via a wide area network. The network operations center is preferably further operable to identify remote devices likely to be malfunctioning based on differences between a standard measure of satisfactory performance and current operational characteristics or data from the remote device. When the differences exceed parameters of satisfactory performance for the remote device, the network operations center is preferably operable to schedule appropriate maintenance.

One technical advantage provided by the present invention is the identification of remote devices, e.g., vending machines, likely to be in a reduced sales state due to various hardware malfunctions including, but not limited to, not accepting paper currency and/or coins or inability to provide change.

An additional technical advantage provided by the present invention is the estimation of losses resulting from a remote device operating in a reduced state.

A further technical advantage provided by the present invention is minimizing maintenance visits to a vending machine or remote point of sale device due to false indications of maintenance needs.

Yet another technical advantage provided by the present invention is providing for more effective management of remote point of sale (POS) devices through prioritization of remote POS device maintenance based on an estimation of lost sales resulting from less than satisfactory performance of a remote device or vending machine.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
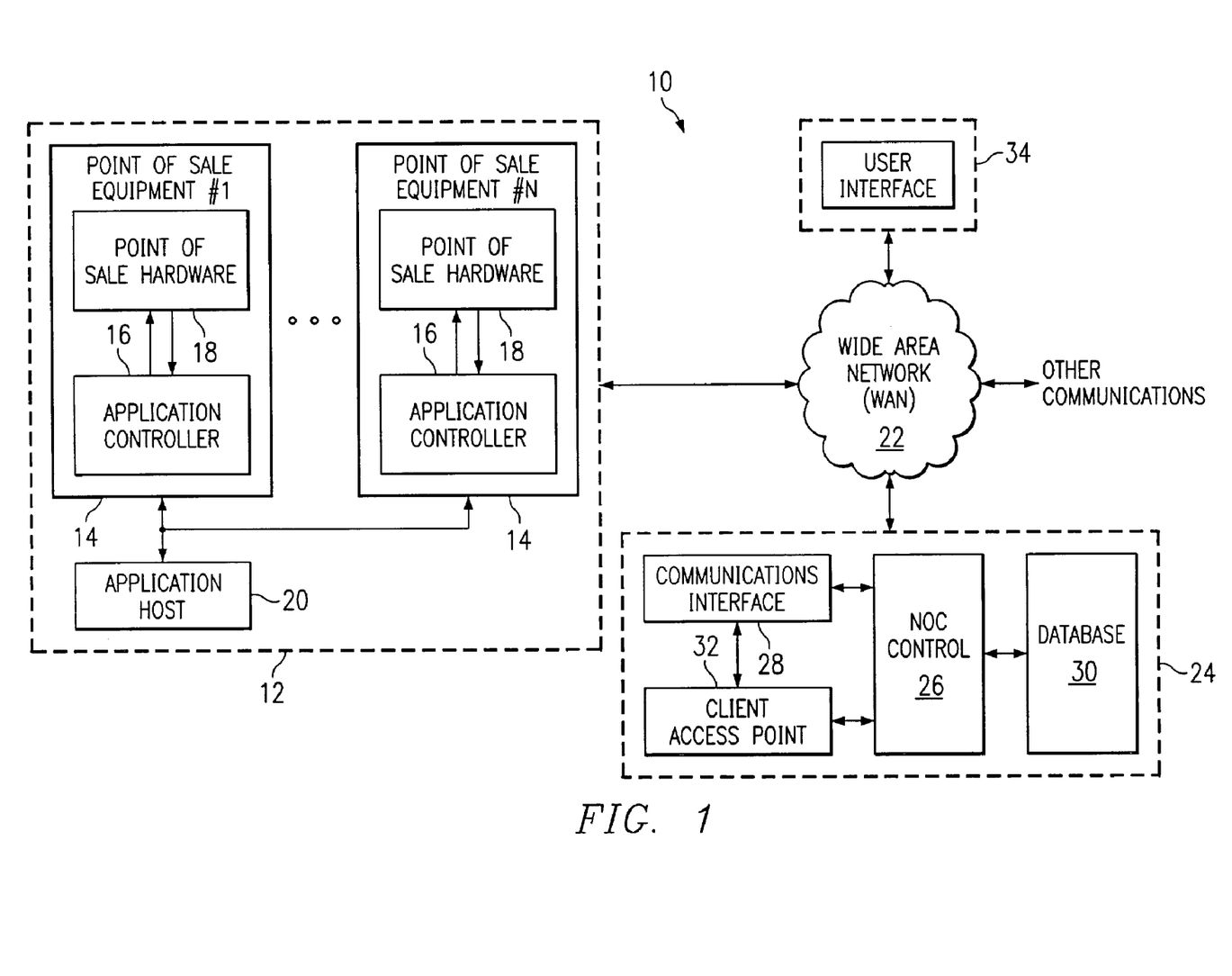
FIG. 1 is a schematic drawing illustrating a functional block diagram of one embodiment of a remote data acquisition system for remote point of sale devices according to teachings of the present invention.
Figure 2:
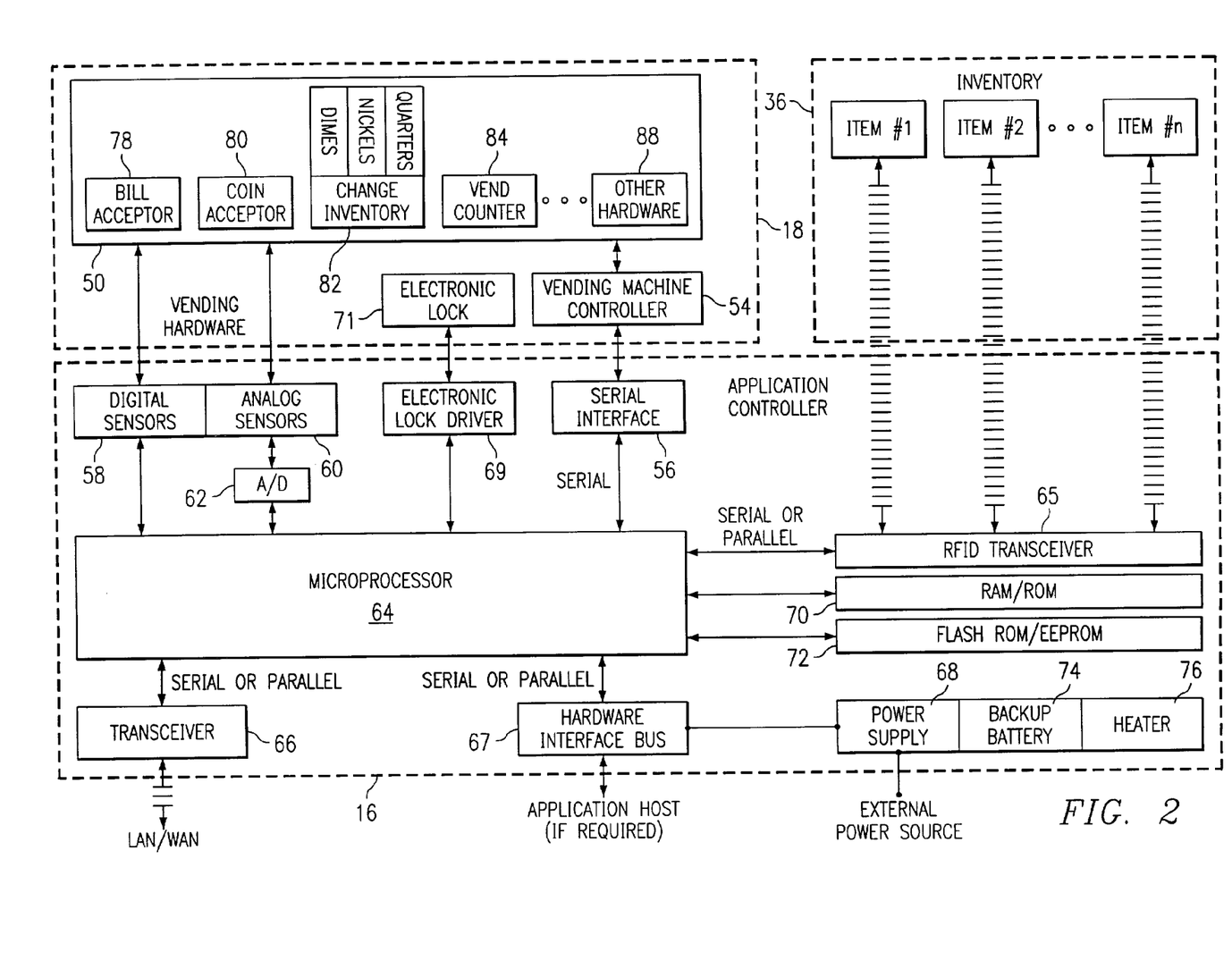
FIG. 2 is a schematic drawing illustrating a functional block diagram of one embodiment of an application controller and its interface with the hardware of a remote point of sale device, such as a vending machine, according to teachings of the present invention.
Figure 3:
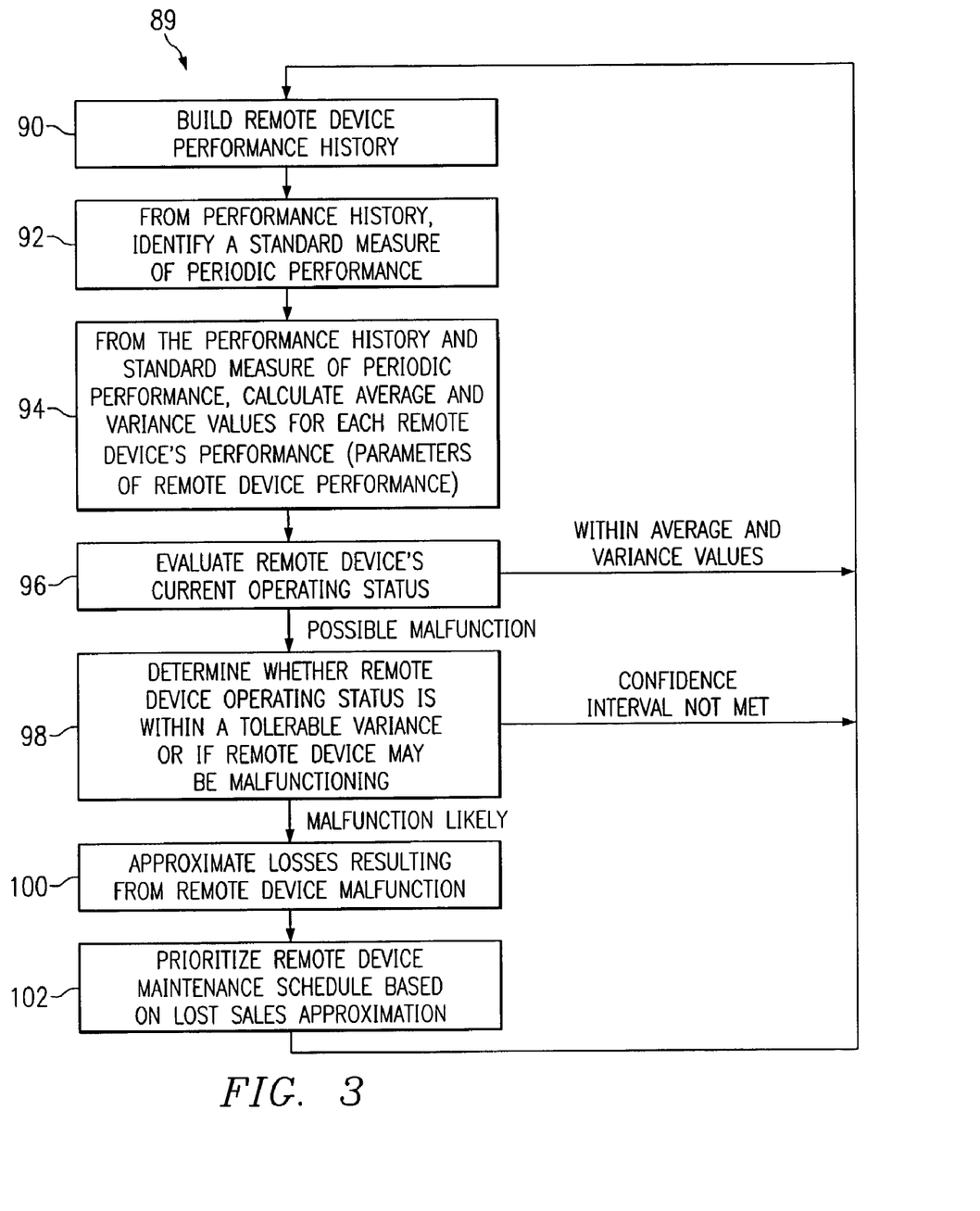
FIG. 3 illustrates a flow chart depicting one embodiment of a method for the statistical estimation of unsatisfactory performance of a remote point of sale device according to teachings of the present invention.

The preferred embodiment of the present invention and its advantages are best understood by referring to FIGS. 1 through 3 of the drawings, where like numerals are used for like and corresponding parts of the various drawings.

FIG. 1 is a functional block diagram of one embodiment of a remote device management and monitoring system for distributed assets or devices, such as remote point of sale (POS) devices, remote dispersing devices and vending machines, according to teachings of the present invention. The terms "distributed assets" and "remote devices" are used in this application to mean any machine, device, system or equipment that may be remotely monitored in accordance with teachings of the present invention. Examples of such distributed assets include, but are not limited to, industrial machines, vending machines, ice machines and beverage dispensing equipment. In addition, according to teachings of the present invention, vending machines may be characterized as either point of sale devices, dispensing devices or both. However, vending machines, point of sale devices and dispensing devices do not necessarily refer to the same type of device when used herein.

In general, system 10 of FIG. 1 communicates information from a remote location or site 12 over a wide area wireless or wire-line network. Remote location or site 12 may include one or more remote devices such as point of sale device 14.

In an embodiment of the present invention directed to vending machine operations, each vending machine may include vending hardware and inventory for performing vending functions and electronically tracking some vending information. Vending machines may provide various types of products to customers such as soft drinks, snacks, newspapers, Internet access, phone cards, etc.

According to one aspect of the present invention, remote point of sale (POS) device 14 preferably includes an application controller 16 coupled to and interfacing with POS hardware 18. POS device 14 may also be equipped with electronics for controlling operations as well as tracking some events. In a vending machine environment, events tracked may include the denominations of monies received, change given, the number of vends from each slot as well as others. Application controllers 16 may also be configured to communicate with embedded electronics as well as equipped to directly sense other events and device or equipment parameters. In a multi-POS-device site 12, application controllers 16 may be enabled to communicate with one another and an application host 20 via onboard wire-line interfaces or wireless transceivers (not expressly shown) using wireline or wireless transmissions respectively. Although the present invention discusses vending machines, other types of remote POS devices, remote dispensing devices or distributed assets are considered within the scope of the present invention.

In one embodiment, an application controllers 16 and application host 20 may be coupled together to form a LAN supported by the wire-line and/or wireless transmissions. In addition, application controllers 16 may also act as repeaters in an embodiment where application host 20 is not provided or is unable to directly communicate with a particular application controller 16 while another application controller 16, which does have an established communication link with application host 20, is able to directly communicate.

Application host 20, when employed, may be used to acquire data captured by application controllers 16 and to package and communicate that data across an external network 22 using a wide area network (WAN) interface. For example, in a vending machine environment, data which may be captured by application controllers 16 includes, but is not limited to, the amount of paper currency accepted, the amount and denominations of coins accepted, the amount and denominations of coins available in the remote devices charge fund as well as the number of vends by the remote device. The format typically employed for capturing and transmitted operational data or characteristics for a vending machine is the DEX (Direct Exchange) format. In alternate embodiments using remote POS devices, remote dispensing devices, industrial machines, ice machines, etc., other data formats may be employed.

Application host 20 may be installed together with application controller 16 inside remote POS device 14 or housed separately in another location. A WAN interface (not expressly shown) preferably included in application controller 20 may be implemented in one of a number of ways. In particular, the WAN interface of application controller 20 may be designed to support a wide area network 22 that can be implemented using wire-line or wireless transmissions.

As shown in FIG. 1, a network operations center (NOC) 24 may be provided to communicate with one or more device sites 12 across wide area network 22. In the embodiment of FIG. 1, network operations center 24 preferably includes a NOC control 26 operable to communicate with wide area network 22 through communications interface 28. According to teachings of the present invention, NOC control 26 can receive data acquired from and transmit data to device sites 12, process the data and store the data into a database 30. NOC control 26 may also be configured to perform instant alert paging, direct dial alarms and other functions to provide real time notification to a remote POS device operator upon the occurrence of certain events (e.g., not accepting money, out-of-change, inventory depletion, etc.). Communications interface 28, between NOC control 26 and the wide area network 22, may be implemented through the use of either wire-line or wireless transmissions.

At network operations center 24, a client access point 32 may be included to provide access from a client interface subsystem (CI) 34 across external network 22. In one implementation, client access point 32 can be a web-based interface allowing user access from a client computer across a network such as the Internet. Other implementations include providing a direct-dial connection between client interface subsystem 34 and client access point 32. Once connected, a user may use client interface subsystem 34 to obtain information from database 30 based upon data acquired from device sites 12. Further, users may be provided with extended services such as trend information developed by mining and analyzing database 30. According to the present invention, system 10 of FIG. 1 combines a number of technologies to provide technical advantages in the area of remote device management.

FIG. 2 illustrates a functional block diagram of one embodiment of the interface between application controller 16, hardware 18 and inventory 36 according to teachings of the present invention. FIG. 2 is explained with reference to one embodiment of a vending machine. However, as mentioned above, the teachings of the present invention are not limited to implementation in the vending machine environment.

In general, application controller 16 interfaces with the internal systems of remote POS device 14 to perform data acquisition and control functions as well as to provide preferably a wire-line and/or wireless data communication transceiver for establishing a communication link with application host 20 (FIG. 1). Referring again to a vending machine as an example, hardware 18 can include one or more electro-mechanical components 50, including, but not limited to, bill acceptor 78, coin acceptor 80, change inventory 82, vend counter 84, as well as other hardware 88, some of which may be coupled to and interface with a vending machine controller (VMC) 54.

Application controller 16 preferably interfaces with hardware 18. This interface can include a serial interface 56 (e.g., Multi-Drop Bus or DEX Port) that communicates with VMC 54 using a standard data protocol (e.g. DEX/UCS) implemented by many conventional vending machines. The interface may also include direct sensing of components 50 using digital sensors 58 and analog sensors 60. Analog sensors 60 may be coupled to analog-to-digital (A/D) converters 62 to convert analog measurements to digital signals. A central microprocessor or microcontroller 64 may be coupled to and interface with serial interface 56, digital sensors 58 and A/D converters 62 to acquire data relating to the operation of hardware 18. Application controller 16 may also include a RFID transceiver device 65 operable to directly scan inventory 36 in order to obtain inventory readings.

Microprocessor 64 may communicate the number of vends by the remote device, amount of inventory remaining for each denomination in change inventory 82, amount of paper currency taken in by bill acceptor 78 as well as other data using a wire-line or wireless LAN transceiver 66 that sends the data via wire-line or wireless transmissions respectively. As discussed above, microprocessor 64 may transmit/receive data to/from an application host 23 located at the remote site. Microprocessor 64 can also communicate with an electronic lock driver 69 which interfaces with an electronic lock 71. In the event that an application controller 16 is collocated with an application host 20 within a POS device 14, then the two may communicate using a hardware interface bus 67 that allows the two devices to share electronic components, for example, transceiver 66.

Also as shown, application controller 16 may include various types of memory units such as random access and read-only memory (RAM/ROM) 70, FLASH memory and/or Electrically Erasable/Programmable read-only-memory (Flash memory/EEPROM) 72 for storing application code as well as operational or other data indicative of one or more characteristics of the remote POS device. The Flash memory can be remotely programmed using the LAN and/or the WAN in the event that its data becomes corrupted or requires upgrade. The present invention is not limited to any specific type of memory unit. Further, application controller 16 may include a power supply 68, a backup battery 74 as well as a heater 76.

In FIG. 3, a method for predicting the maintenance needs of remote devices according to teachings of the present invention is illustrated. Method 89 preferably enables a distributed asset operator to more effectively manage remote devices, such as remote POS device 14, through improved evaluation of the current operating status of such devices without having to be present at the remote location or site 12.

Method 89 may be implemented in software. Such an implementation of method 89 may be stored in and executed by hardware and software included in remote POS device 14 or other remote device. All or portions of method 89 may be stored and executed by hardware and software at a network operations center. Other implementations, such as solely in hardware or in a software and hardware combination, and uses of method 89 beyond the vending machine environment are considered within the scope of the present invention.

For each remote device coupled to WAN 22 in a distributed asset operator's system, method 89 preferably begins by building a performance history coupled to WAN 22 at 90. For a remote POS device 14, such as a vending machine, recently added to a distributed asset operator's system, method 89 preferably begins to build a performance history for each device at 90 by accumulating operational data. For remote devices that have existed on the distributed asset operator's system, new operational data for each remote device is preferably added to the remote device's previous history at 90 such that method 89 maintains a rolling performance history for existing devices. Similarly, performance histories for each remote device are preferably updated or supplemented upon each iteration through method 89.

In one embodiment of the present invention, method 89 preferably operates on a single remote device at a time. In such an embodiment, the functionality of method 89 may apply to the specific remote POS device 14 under evaluation. The evaluation of more than one remote device at a time may be utilized in accordance with teachings of the present invention and is considered within the scope thereof.

At 90, method 89 preferably tracks one or more performance variables, operational aspects or other characteristics for each remote device. In a distributed vending machine environment, for example, the performance variables, operational aspects or other characteristics that may be tracked include, but are not limited to, the number of bills received, the number of coins accepted, the level of available change remaining in change inventory 82, the number of vends by the remote vending machine. Many other characteristics may be monitored in this and a variety of other embodiments.

In one embodiment of the present invention, a thirty (30) day performance history is built for the one or more performance variables, operational aspects or other characteristics tracked for each remote device. Alternative periods of performance history may be used without departing from the spirit and scope of the present invention. The performance histories may be stored in a memory device located at each remote device, in database 30 at NOC 26, in both locations as well as by other means.

Once a performance history has been built or established, the performance history of existing remote devices has been supplemented or updated at 90, method 89 preferably proceeds to 92 where a subset of the performance history for each remote device is identified as a standard measure of satisfactory, periodic performance for each respective remote device. In one embodiment of the present invention, a standard measure of satisfactory periodic performance may be defined as a normal day. In a vending machine environment, for example, this standard measure of satisfactory, periodic performance or normal day, further defined as a day where at least one bill and/or at least one coin has been accepted, there are coins of each denomination present in change inventory 82 and the vending machine has performed at least one operation, e.g., at least one vend has occurred. Once a standard measure of satisfactory, periodic performance has been identified, method 89 preferably proceeds to 94.

At 94, the performance history and standard measure of satisfactory, periodic performance for respective remote devices are used to calculate characteristics or parameters of remote device performance for various performance or operational aspects of each device. In a vending machine environment, for example, characteristics or parameters of remote device performance calculated may include, but are not limited to, average and variance values for the number of vends, average and variance values for the number of bills or amount of paper currency accepted, average and variance values for the number of coins accepted, average and variance values for the various denominations included in change inventory 82, as well as other values. Other measures such as mean and standard deviations, etc., may also be employed without departing from the spirit and scope of the present invention.

Once preferred parameters for satisfactory performance including various operational or performance aspects have been calculated at 94, method 89 preferably proceeds to 96. At 96, an evaluation of a given remote POS device 14, such as a vending machine, current operating status may be performed. According to teachings of the present invention, the evaluation of a remote device's current or most recent operating status may be performed by comparing the remote device's most recent operating characteristics and data (e.g., in a vending machine environment, extracting the number of bills or coins accepted, the number of vends for the current period, the amount of change remaining in change inventory 82, etc., from the vending machine's DEX data) to the standard measure of satisfactory, periodic performance identified at 92. Although days are discussed as the time period of reference in one embodiment of the present invention, other time increments such as hours, weeks, etc., may be used where the remote device being evaluated requires more or less frequent monitoring and are considered within the scope of the present invention.

The results obtained from the comparisons between the remote device's most recent operating characteristics and the remote device's standard measure of satisfactory periodic performance are then preferably compared to the averages and variances of corresponding operational characteristics such as, again in a vending machine environment, the number of bills accepted, the number of coins accepted, the number of vends performed by the targeted remote device or vending machine, the amount of change remaining in the targeted device's change inventory, etc. If the results obtained at 96 are within the averages and variances or parameters of remote device performance calculated at 94, the targeted remote device may be determined to be operating normally and method 89 preferably returns to 90 where the performance evaluation of the next remote device may be awaited. If the results obtained at 96 are determined to be outside of or exceed the averages and variances calculated at 94, the targeted remote device may be determined likely to be operating in a reduced sales capacity or otherwise malfunctioning.

At 96, the most recent operational characteristic tracking data, such as DEXdata for vending machines, of a targeted remote device, is parsed such that, for example, the number of bills accepted, the number of vends, the number of coins accepted or change remaining in change inventory 82 may be compared to the standard measure of periodic performance for the remote device under evaluation. In one embodiment of the present invention, this comparison may be performed on a daily basis. However, other periods of evaluation are considered within the spirit and scope of the present invention.

In evaluating the most recent operational data for a remote POS device 14, those remote POS devices 14 having current operational data indicating one or more operational or performance parameters being different from the standard measure of satisfactory periodic performance and lying outside of or exceeding the average and variances values calculated for the remote POS device 14 under evaluation are further evaluated to determine the likelihood that the differences in the operational or performance data indicate a malfunction in the remote POS device 14. The significance of the results obtained at 96 indicating that a remote POS device 14 may be malfunctioning are preferably evaluated at 98.

At 98, a determination of whether a remote POS device's 14 operating status indicates that the remote POS device 14 is likely to be malfunctioning is preferably made. To make such a determination, a confidence interval or likelihood estimator of device malfunction is preferably calculated.

Statistical methods that may be used to calculate a confidence interval or likelihood estimator include, but are not limited to, binomial and exponential distributions. Using such statistical methods, the confidence interval or likelihood estimates may be altered, specified or otherwise determined. In addition, the use of confidence intervals and likelihood estimators enable a high degree of malfunction likelihood to be determined. Consequently, only those remote POS devices 14 most likely to be malfunctioning (i.e., those having confidence intervals of 95%, 99%, etc.) operating in a reduced sales state or otherwise operating in a degraded manner will be scheduled for a maintenance visit. Accordingly, for those remote POS devices 14 whose current operating status lies outside of its parameters of remote POS device 14 performance but does not show a likelihood of actually having one or more remote POS device 14 malfunctions, method 89 preferably returns to 90 to await the next remote POS device 14 to be evaluated. For those remote POS devices 14 whose current operating status exceeds or lies outside of their parameters of remote POS device performance and, when evaluated under one or more statistical methods, whose confidence interval or likelihood estimator predicts a high probability of a remote POS device malfunction, method 89 preferably proceeds to 100.

At 100, an approximation of losses, such as lost sales production, etc., from the malfunctioning remote POS device 14 is preferably calculated. For example, if the malfunctioning remote POS device 14 is a vending machine, the lost sales resulting from the malfunctioning vending machine may be calculated from the malfunctioning vending machine's standard measure of periodic performance or normal day calculated at 92 as well as by using the losses that have accumulated while waiting for the vending machine's operational data to be such that a desired confidence interval, e.g., a 95% confidence interval, or likelihood estimator is obtained at 98. Alternative methods of approximating or predicting the amount of losses associated with a malfunctioning remote POS device 14 are considered within the scope of the present invention. Once the losses for a malfunctioning remote device determined likely to be malfunctioning have been approximated or predicted, method 89 preferably proceeds to 102.

At 102, prioritization of maintenance scheduling for the remote devices likely to be malfunctioning, based on the values of predicted or approximated losses, is preferably performed. For example, a distributed asset operator having a plurality of remote POS devices 14 may choose to address the malfunctioning remote POS device 14 most likely to result in the greatest losses first. Uses other than the scheduling of maintenance routes, such as vending machine refill events, remote POS device replacement schedules, may be realized from the teachings of the present invention. Upon the prioritization of maintenance scheduling at 102, method 89 preferably returns to 90 where the next remote device performance evaluation may be awaited.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A remotely located point of sale device comprising:
   at least one application controller operably coupled to the remotely located point of sale device;
   the application controller having at least one microprocessor operably coupled to at least one memory device;
   the application controller operable to communicate at least one operational characteristic of the remotely located point of sale device to at least one destination;
   a program of instructions storable in the at least one memory device and executable in the at least one microprocessor; and
   the program of instructions operable to build a performance history based on the at least one operational characteristic of the remotely located point of sale device, to identify a standard measure of satisfactory, periodic performance for the remotely located point of sale device based on the performance history, to identify operational characteristics of the remotely located point of sale device based on the standard measure of satisfactory, periodic performance, to compare a current operational characteristic of the remotely located point of sale device to the standard measure of satisfactory, periodic performance and identify differences that exceed the standard measure of satisfactory, periodic performance, to evaluate the differences that exceed the standard measure of satisfactory, periodic performance and determine if the differences indicate a malfunction of the remotely located point of sale device and to approximate economic losses resulting from the malfunction.

2. The remotely located point of sale device of claim 1 further comprising a vending machine.

3. The remotely located point of sale device of claim 1 further comprising the program of instructions operable to determine whether the differences are within a tolerable variance.

4. The remotely located point of sale device of claim 1 further comprising the program of instructions operable to maintain a rolling performance history of remotely located point of sale device operational performance.

5. The remotely located point of sale device of claim 1 further comprising the program of instruction operable to calculate a confidence interval to indicate the likelihood that the differences that exceed the standard measure of satisfactory, periodic performance indicate a remotely located point of sale device operational malfunction.

6. A remote device management system comprising:
   a plurality of remote devices operably coupled to a wide area network;
   at least one remote device selected from the group consisting of a vending machine, a remote point of sale device, an industrial machine, an ice machine, a dispensing device or a beverage dispensing device;
   a network operations center operably coupled to the wide area network;
   the network operations center having at least one wide area network interface and at least one control;
   the network operations center operable to communicate with the at least one remote device via the wide area network interface and via the wide area network; and
   the network operations center control operable to build an operational performance history for the at least one remote device, identify a standard measure of satisfactory performance for the remote device, generate parameters of satisfactory performance for the remote device, and identify remote devices likely to be malfunctioning based on differences between the standard measure of satisfactory performance and current operational characteristics of the remote device when the differences exceed the parameters of satisfactory performance for the remote device.

7. The remote device management system of claim 6 further comprising the network operations center control operable to approximate economic losses resulting from a malfunctioning remote device.

8. The remote device management system of claim 7 further comprising the network operations center control operable to prioritize remote device maintenance according to the approximated economic losses.

9. The remote device management system of claim 6 further comprising the network operations center control operable to maintain a rolling operational performance history for each remote device.

10. The remote device management system of claim 6 further comprising the network operations center control operable to calculate a likelihood estimator to identify any remote device likely to be malfunctioning.

11. The remote device management system of claim 10 further comprising the network operations center control operable to calculate the likelihood estimator using a binomial distribution.

* * * * *